(12) United States Patent
Xiao

(10) Patent No.: US 8,702,065 B2
(45) Date of Patent: Apr. 22, 2014

(54) QUICK TIGHTENER

(75) Inventor: Zhaoyin Xiao, Taizhou (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 0 days.

(21) Appl. No.: 13/384,243

(22) PCT Filed: Nov. 26, 2011

(86) PCT No.: PCT/CN2011/082997
§ 371 (c)(1),
(2), (4) Date: Jan. 16, 2012

(87) PCT Pub. No.: WO2013/029316
PCT Pub. Date: Mar. 7, 2013

(65) Prior Publication Data
US 2013/0276273 A1    Oct. 24, 2013

(30) Foreign Application Priority Data

Sep. 2, 2011    (CN) .......................... 2011 1 0258993

(51) Int. Cl.
*B25B 25/00*    (2006.01)
(52) U.S. Cl.
USPC .......................... 254/217; 254/214; 24/68 CD
(58) Field of Classification Search
None
See application file for complete search history.

(56) References Cited

U.S. PATENT DOCUMENTS 5,156,506 A * 10/1992 Bailey ........................... 410/100
7,464,915 B2 * 12/2008 Liu et al. ........................ 254/217

FOREIGN PATENT DOCUMENTS

CN    2803637 Y    8/2006
CN    2894891 Y    5/2007

* cited by examiner

*Primary Examiner* — Jack W. Lavinder
(74) *Attorney, Agent, or Firm* — Minder Law Group; Willy H. Wong

(57) ABSTRACT

The present invention discloses a quick tightener, which addresses the problems existing in the conventional tighteners such as inconvenient operation or failure in use under extreme conditions. The quick tightener includes a support, a handle, a ratchet wheel and a half-moon shaft. The half-moon shaft is composed of a first half-moon shaft and a second half moon shaft. Said first half-moon shaft could be fixedly connected with the ratchet wheel. Said second half-moon shaft could be fixedly connected with the ratchet wheel in the circumferential direction and axially move relative to the ratchet wheel. A clutch device is located between said first half-moon shaft and second half-moon shaft to connect the second half-moon shaft to the first half-moon shaft or disengage the second half-moon shaft from the first half-moon shaft. Such a quick tightener is equipped with the advantages such as preferential reliability and a high practical value.

13 Claims, 5 Drawing Sheets

QUICK TIGHTENER

BACKGROUND OF THE INVENTION

1. Field of Invention

The present invention relates to a quick tightener for binding cargoes in the field of mechanics.

2. Related Art

Generally speaking, cargoes are required to be bound together while being transported by vehicles, so as to prevent losses or damages of the cargoes incurred from being dropped off or collision with each other. Even though the cargoes could be bound together by ropes directly, it is time consuming and laboursome in operation and difficult to bind the cargoes firmly.

To this end, a tightener was developed, which is regarded as being an advanced binding tool. It is convenient and safe to bind the cargoes by using the tighteners. The conventional tighteners generally include a support, a half-moon shaft, a ratchet wheel, a handle and a binding belt. The half-moon shaft is connected with the ratchet wheel and is located on the support. The handle could be embedded onto the ratchet wheel. The binding belt could be connected to the half-moon shaft.

During operation, the binding belt has to pass through a long slot between two half-moon shafts, so as to start the binding process. When the temperature is quite low outside, the binding belt would ice or the head of the binding belt would fluff, or the intermediate part of the mesh belt would knot, in which circumstances the binding belt could not pass through the slot of the half-moon shaft and thus could not be used. Moreover, when the mesh belt is to pass through the reel slot, the length of the moving belt has to be adjusted, and the mesh belt has to be pulled out of the reel slot, which brings about inconvenient operation.

SUMMARY OF THE INVENTION

In order to address the aforementioned problems existing in the prior art, one object of the invention is to provide a quick tightener which could be used to rapidly wind the belt in various extreme conditions.

The present invention provides a quick tightener, comprising a support, a handle, a ratchet wheel and a half-moon shaft. The handle could be hinged to the support via the half-moon shaft. The ratchet wheel could be connected with the half-moon shaft and the handle could drive the ratchet wheel to rotate. The half-moon shaft is composed of a first half-moon shaft and a second half moon shaft, in which both the first half-moon shaft and the second half-moon shaft could be connected with the ratchet wheel of the tightener and a spacing could be provided therebetween to connect the binding belt. Said first half-moon shaft could be fixedly connected with the ratchet wheel. Said second half-moon shaft could be fixedly connected with the ratchet wheel in the circumferential direction. Said second half-moon shaft could axially move relative to the ratchet wheel. A clutch device is located between said first half-moon shaft and second half-moon shaft to connect the second half-moon shaft to the first half-moon shaft or disengage the second half-moon shaft from the first half-moon shaft.

During operation, the first half-moon shaft is detached from the second half-moon shaft by using the clutch device. In such a case, the second half-moon shaft is drawn out along the axial direction, and the mesh belt is directly placed on the first half-moon shaft, and then the second half-moon shaft is inserted for restoration. The belt is rapidly passed. Thereafter, the handle is turned to wind the mesh belt tightly and then the cargoes would be firmly bound together.

According to one embodiment of the rapid tightener of the invention, a first via hole is set at the end of the ratchet wheel to pass the first half-moon shaft and a second via hole is set to pass the second half-moon shaft. Connecting parts are projected vertical from the end face of the ratchet wheel at both edges of the first via hole and second via hole, and said two connecting parts could be embedded onto the handle and support respectively.

The ratchet wheel could only rotate by using the connecting parts, which makes sure that the ratchet wheel would not be displaced in the direction vertical to the half-moon shaft.

According to another embodiment of the rapid tightener of the invention, the ratchet wheel includes a first ratchet wheel and a second ratchet wheel. A positioning protrusion is provided on the first ratchet wheel, and a positioning recess is provided on the second ratchet wheel which is matched with the positioning protrusion. Said positioning protrusion could be embedded within the positioning recess. One connecting part is located at one side of the first ratchet wheel and the other connecting part is located at the other side of the second ratchet wheel.

According to another embodiment of the rapid tightener of the invention, the first and second ratchet wheels are formed by stamping.

The first and second ratchet wheels are stamped in such a manner that the first via hole, second via hole and connecting part thereof could be formed one time. The first ratchet wheel could be firmly connected with the second ratchet wheel by using the positioning protrusion and the positioning recess, and would not rotate relative to the second ratchet wheel.

According to another embodiment of the rapid tightener of the invention, the clutch device has a crown bar located on the first half-moon shaft and a positioning hole on the second half-moon shaft. A first spring could be provided at the crown bar, and the crown bar could be embedded into the positioning hole with the elastic force of the first spring.

After the crown bar is embedded into the positioning hole of the second half-moon shaft with the elastic force of the first spring, the first half-moon shaft is firmly connected with the second half-moon shaft. As soon as the crown bar is drawn out of the positioning hole, the second half-moon shaft could axially move relative to the first half-moon shaft.

According to another embodiment of the rapid tightener of the invention, a clutch lever could be provided at the positioning hole of the second half-moon shaft. A second spring could be provided at the clutch lever which makes the clutch lever tend to be drawn into the positioning hole. The crown bar could be pressed against the end of the clutch lever with the action of the first spring.

Obviously, the clutch lever is placed within the positioning hole in the initial state. An external force could be exerted on the clutch lever against the elastic force of the second spring, so that the crown bar in the positioning hole would be drawn out by the clutch lever.

According to another embodiment of the rapid tightener of the invention, a tapered guide means could be located at the end of the positioning hole.

While the second half-moon shaft moves in the axial direction, the crown bar is smoothly embedded into the positioning hole or smoothly removed from the positioning hole by using the guide means.

According to another embodiment of the rapid tightener of the invention, the first half-moon shaft could be fixedly connected with a hollow crown bar seat. One end of the crown bar seat could be coupled to one side of the first half-moon shaft, and the other end of the crown bar seat could extend out of the other side of the first half-moon shaft and could be fixedly connected with a press cap. The crown bar and the first spring could be placed within the crown bar seat. Both ends of the spring could be pressed against the crown bar seat and the crown bar respectively. The crown bar could partially extend out of the press cap with the elastic force of the first spring.

The crown bar and first spring are covered by the crown bar seat, so that the crown bar would be prevented from being affected by environmental factors as much as possible. Consequently, the crown bar would act stably.

According to another embodiment of the rapid tightener of the invention, a seal ring is provided between the side of the crown bar and the crown bar seat.

Such a configuration would make the crown bar act smoothly.

According to another embodiment of the rapid tightener of the invention, the second half-moon shaft could be fixedly connected with a hollow clutch lever seat. Both the clutch lever and the second spring could be located within the clutch lever seat. The second spring could be covered on the clutch lever. Under the elastic force of the second spring, the inner end of the clutch lever tends to be drawn into the positioning hole, and the outer end of the clutch lever tends to extend out of the clutch lever seat.

The clutch lever and second spring are covered by the clutch lever seat, so that the clutch lever would be prevented from being affected by environmental factors as much as possible. Consequently, the clutch lever would act stably.

According to another embodiment of the rapid tightener of the invention, a seal ring is provided between the clutch lever and the clutch lever seat.

Such a configuration would make the clutch lever act smoothly.

According to another embodiment of the rapid tightener of the invention, a limitation groove is provided on the second half-moon shaft. After the second half-moon shaft axially moves relative to the ratchet wheel, the said crown bar could be embedded into the limitation groove, so that the half-moon shaft is positioned.

The travel of the second half-moon shaft is so limited by the limitation groove in combination with the crown bar that the second half-moon shaft could only move in the axial direction within a predetermined journey. As a result, the second half-moon shaft would be prevented from being detached from the tightener.

According to another embodiment of the rapid tightener of the invention, the side of the limitation groove close to the crown bar is set as an inclined guide surface and the other side of the limitation groove is set as an upright surface vertical to the axial direction of the second half-moon shaft.

Such a configuration makes the crown bar be smoothly embedded into the positioning groove or smoothly removed from the positioning groove.

Compared with the prior art, in the quick tightener of the invention, only one of the first and second half-moon shafts could move in the axial direction, and thus the belt could be rapidly mounted. Moreover, even if the mesh belt knots, fluffs at the ends or ices, the mesh belt would be bound fast, and thus has a high practical value.

Meanwhile, in the quick tightener of the invention, the first half-moon shaft could be connected with the second half-moon shaft by the crown bar, and only one of the first and second half-moon shafts could move in the axial direction by means of the clutch lever. The clutch lever could be easily pressed during the process of engagement and disengagement, which displays a convenient application. The limitation groove improves the reliability of the quick tightener as a whole, and prevents the first or second half-moon shaft from being dropped off.

In addition, the ratchet wheel is formed by stamping one time, and has a simple structure and low cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
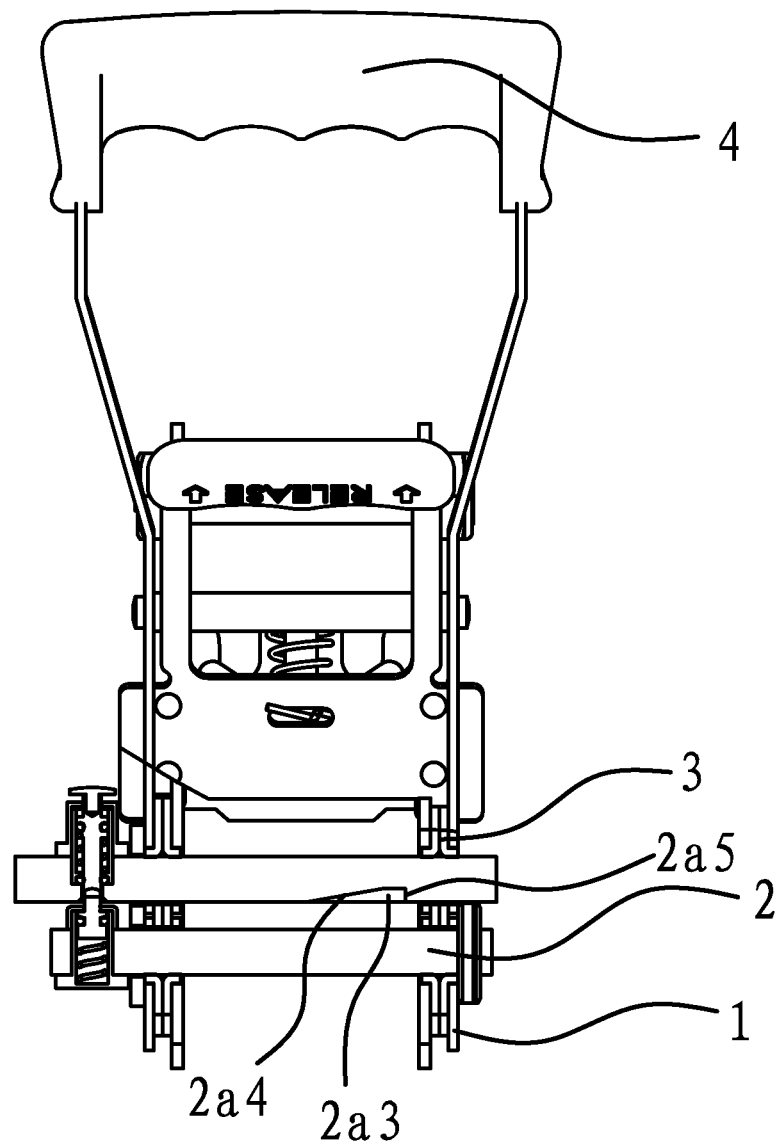
FIG. 1 is a front view of the quick tightener according to the invention.
Figure 2:
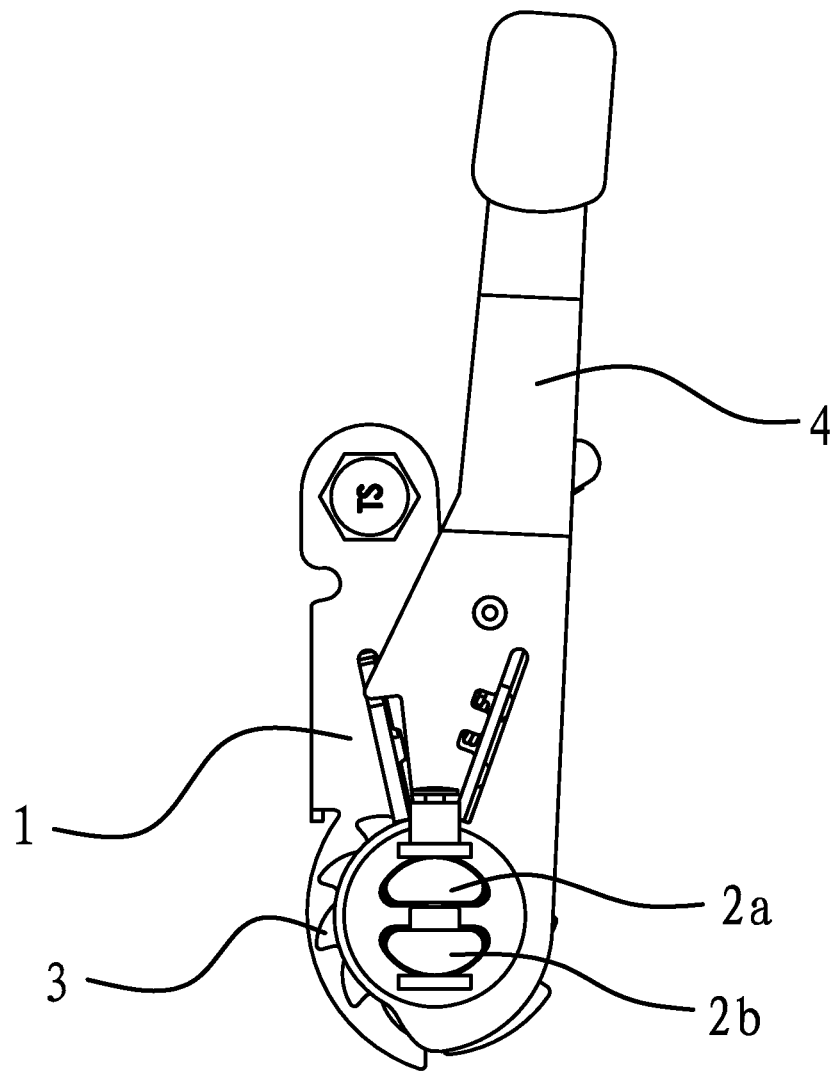
FIG. 2 is a side view of the quick tightener according to the invention.

As shown in FIGS. 1 and 2, a quick tightener includes a support 1, a half-moon shaft 2, a ratchet wheel 3, a handle 4 and a binding belt. The half-moon shaft 2 is connected with the ratchet wheel 3 and located on the support 1. The handle 4 is hinged to the support 1 via the half-moon shaft. The handle 4 could drive the ratchet wheel 3 to rotate. The binding belt is connected with the half-moon shaft 2.

Figure 3:
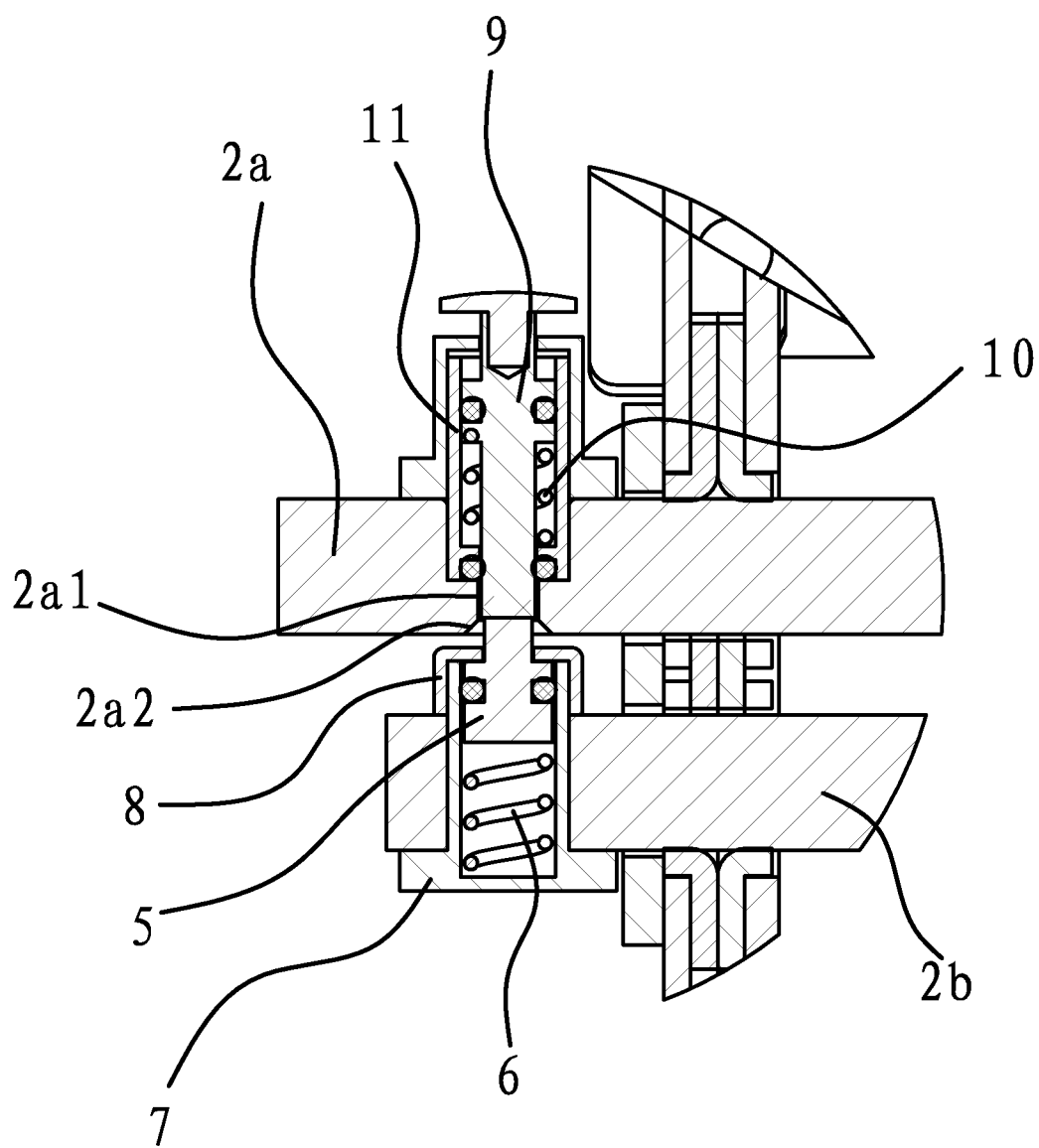
FIG. 3 is a section view taken at the clutch device of the quick tightener according to the invention.

Referring to FIG. 3, the quick tightener has second half-moon shaft 2a and a first half-moon shaft 2b disposed on the support 1 of the tightener. Both the second half-moon shaft 2a and the first half-moon shaft 2b are connected to the ratchet wheel 3 of the tightener, and a spacing is provided between the second half-moon shaft 2a and the first half-moon shaft 2b to connect the binding belt.

The second half-moon shaft 2a is fixedly connected with the ratchet wheel 3 and the first half-moon shaft 2b is fixedly connected with the ratchet wheel in the circumferential direction. The second half-moon shaft 2a could axially move relative to the ratchet wheel. A clutch device is located between the second half-moon shaft 2a and the first half-moon shaft 2b to connect the second half-moon shaft 2a to the first half-moon shaft 2b or disengage the second half-moon shaft 2a from the first half-moon shaft 2b.

Figure 4:
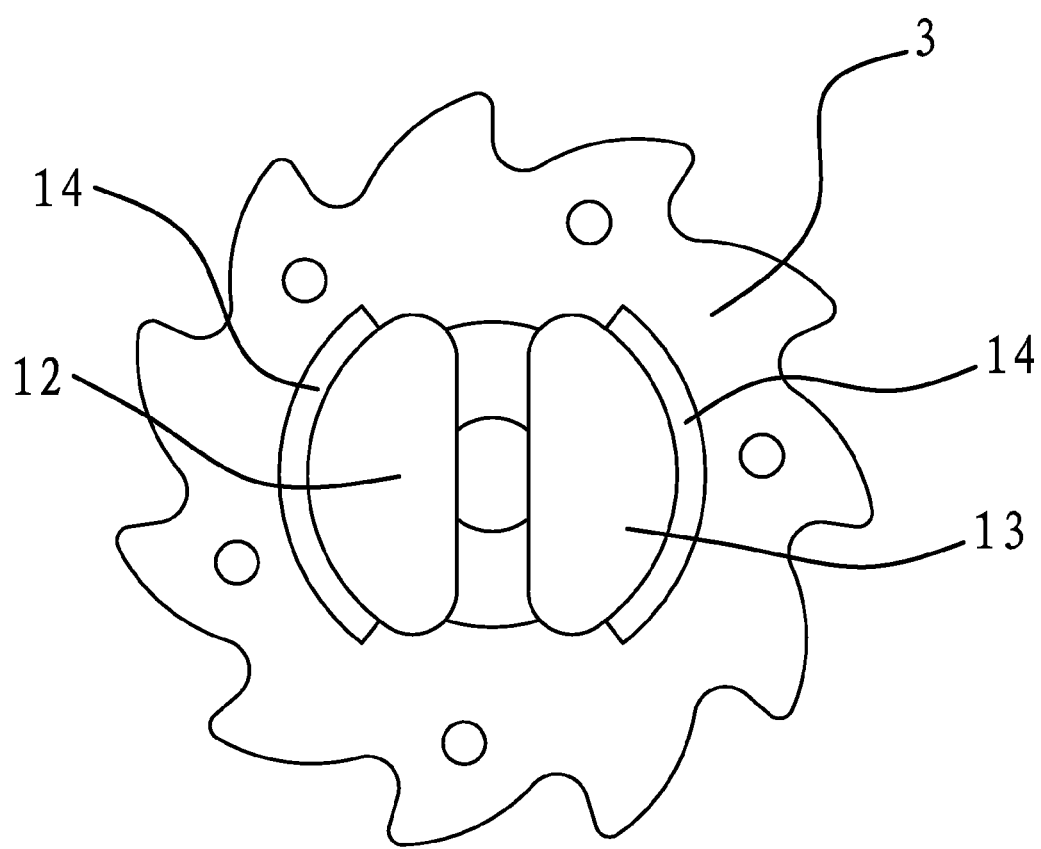
FIG. 4 is a front view of the ratchet wheel of the quick tightener according to the invention.
Figure 5:
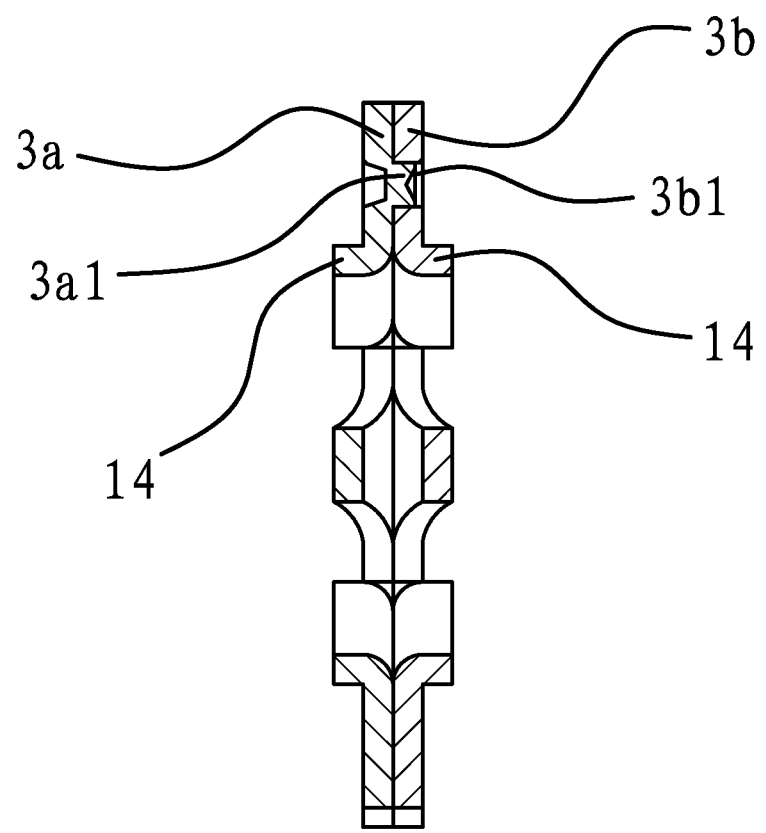
FIG. 5 is a section view of the ratchet wheel of the quick tightener according to the invention.

As shown in FIGS. 4 and 5, a first via hole 12 is set at the end of the ratchet wheel 3 to pass the first half-moon shaft 2b and a second via hole 13 is set to pass the second half-moon shaft 2a. Connecting parts 14 are projected vertical from the end face of the ratchet wheel 3 at both edges of the first via hole 12 and second via hole 13. Said two connecting parts 14 are embedded onto the handle 4 and support 1 respectively. The ratchet wheel 3 is composed of a first ratchet wheel 3a and a second ratchet wheel 3b. A positioning protrusion 3a1 is provided on the first ratchet wheel 3a, and a positioning recess 3b1 is provided on the second ratchet wheel 3b which is matched with the positioning protrusion 3a1. Said positioning protrusion 3a1 is embedded within the positioning recess 3b1. A connecting part 14 is located at one side of the first ratchet wheel 3a and the other connecting part 14 is located at the other side of the second ratchet wheel 3b. In this embodiment, the first ratchet wheel 3a and second ratchet wheel 3b are formed by stamping.

The clutch device has a crown bar 5 located on the first half-moon shaft 2b and a positioning hole 2a1 on the second half-moon shaft 2a. A first spring 6 is provided at the crown bar 5. The crown bar 5 could be embedded into the positioning hole 2a1 with the elastic force of the first spring 6. The first half-moon shaft 2b is fixedly connected with a hollow crown bar seat 7. One end of the crown bar seat 7 is coupled to one side of the first half-moon shaft 2b, and the other end of the crown bar seat 7 extends out of the other side of the first half-moon shaft 2b and is fixedly connected with a press cap 8. The crown bar 5 and the first spring 6 are placed within the crown bar seat 7. Both ends of the spring 6 are pressed against the crown bar seat 7 and the crown bar 5 respectively. The crown bar 5 partially extends out of the press cap 8 with the elastic force of the first spring 6. A seal ring is provided between the side of the crown bar 5 and the crown bar seat 7. In this embodiment, the second half-moon shaft 2a is provided with a projected stopper at the other end of the crown bar seat 7. Obviously, the stopper is pressed against one side of the support and the crown bar seat 7 is pressed against the other side of the support. In such a scenario, the second half-moon shaft 2a is firmly fixed to the ratchet wheel 3.

A clutch lever 9 is provided at the positioning hole 2a1 of the second half-moon shaft 2a. A second spring 10 is provided at the clutch lever 9, which makes the clutch lever 9 tend to be drawn into the positioning hole 2a1. The crown bar 5 is pressed against the end of the clutch lever 9 with the action of the first spring 6. The second half-moon shaft 2a is fixedly connected with a hollow clutch lever seat 11. Both the clutch lever 9 and the second spring 10 are located within the clutch lever seat 11. The second spring 10 is covered on the clutch lever 9. Under the elastic force of the second spring 10, the inner end of the clutch lever 9 tends to be drawn into the positioning hole 2a1, and the outer end of the clutch lever 9 tends to extend out of the clutch lever seat 11. A seal ring is provided between the clutch lever 9 and the clutch lever seat 11. In this embodiment, a tapered guide means 2a2 is located at the end of the positioning hole 2a1.

A limitation groove 2a3 is provided on the second half-moon shaft 2a. After the second half-moon shaft 2a axially moves relative to the ratchet wheel 3, the said crown bar 5 could be embedded into the limitation groove 2a3, so that the half-moon shaft is positioned. The side of the limitation groove 2a3 close to the crown bar is set as an inclined guide surface 2a4 and the other side of the limitation groove 2a3 is set as an upright surface 2a5 vertical to the axial direction of the second half-moon shaft.

During the normal operation of the tightener, the clutch lever 9 is located within the positioning hole 2a1. The crown bar 5 is embedded into the positioning hole 2a1 and pressed against the clutch lever 9. The first half-moon shaft 2a is connected with the second half-moon shaft 2b. The binding belt passes through the spacing between the first half-moon shaft 2a and the second half-moon shaft 2b and is firmly connected to the half-moon shaft 2.

An external force is exerted on the clutch lever 9 in operation. The clutch lever 9 extends out of the positioning hole 2a1 against the elastic force of the second spring 10, in which process the crown bar 5 is removed from the positioning hole 2a1 against the elastic force of the first spring 6, and the second half-moon shaft 2a could move in the axial direction without any limitation until the limitation groove 2a3 is set on the crown bar 5. As such, the mesh belt could be rapidly disposed or removed. Once the operation is accomplished, the second half-moon shaft 2a returns to the initial position and the crown bar 5 is embedded into the positioning hole 2a1 again. This way, the second half-moon shaft 2a is firmly connected with the first half-moon shaft 2b.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although these terms are used herein, such as support 1, half-moon shaft 2 and ratchet wheel 3, the other similar terms could also be used. These terms are merely used to describe and explain the essence of the invention more conveniently, and any limitation to said terms is regarded as departing from the spirit of the invention.

LIST OF REFERENCE NUMERALS 1 support
2 half-moon shaft
2a second half-moon shaft
2a1 positioning hole
2a2 guide means
2b first half-moon shaft
2a3 limitation groove
2a4 guide surface
2a5 upright surface
3 ratchet wheel
3a first ratchet wheel
3a1 positioning protrusion
3b second ratchet wheel
3b1 positioning recess
4 handle
5 crown bar
6 first spring
7 crown bar seat
8 press cap
9 clutch lever
10 second spring
11 clutch lever seat
12 first via hole
13 second via hole
14 connecting part

What is claimed is:

1. A quick tightener, comprising a support (1), a handle (4), a ratchet wheel (3) and a half-moon shaft (2), the handle (4) is hinged to the support (1) via the half-moon shaft (2), the ratchet wheel (3) is connected with the half-moon shaft (2) and the ratchet wheel (3) is rotatable driven by the handle (4), the half-moon shaft (2) is composed of a first half-moon shaft (2b) and a second half moon shaft (2a), in which both the first half-moon shaft (2b) and the second half-moon shaft (2a) are connected with the ratchet wheel (3) of the tightener and a spacing is provided there between to connect a binding belt, characterized in that, said first half-moon shaft (2b) is fixedly connected with the ratchet wheel (3), said second half-moon shaft (2a) is fixedly connected with the ratchet wheel (3) in a circumferential direction, said second half-moon shaft (2a) is moveable axially relative to the ratchet wheel (3), and a clutch device is located between said first half-moon shaft (2b) and second half-moon shaft (2a) to connect the second half-moon shaft (2a) to the first half-moon shaft (2b) or disengage the second half-moon shaft (2a) from the first half-moon shaft (2b);

wherein the clutch device has a crown bar (5) located on the first half-moon shaft (2b) and a positioning hole (2a1) on the second half-moon shaft (2a), a first spring (6) is provided at the crown bar (5), and the crown bar (5) is embedded into the positioning hole (2a1) with an elastic force of the first spring (6); and wherein a clutch lever (9) is provided at the positioning hole (2a1) of the second half-moon shaft (2a), a second spring (10) is provided at the clutch lever (9) which makes the clutch lever (9) tend to be drawn into the positioning hole (2a1), and the crown bar (5) is pressed against an end of the clutch lever (9) with an action of the first spring (6); and wherein the first half-moon shaft (2b) is fixedly connected with a hollow crown bar seat (7), one end of the crown bar seat (7) is coupled to one side of the first half-moon shaft (2b), the other end of the crown bar seat (7) extends out of the other side of the first half-moon shaft (2b) and is fixedly connected with a press cap (8), the crown bar (5) and the first spring (6) is placed within the crown bar seat (7), both ends of the spring (6) are pressed against the crown bar seat (7) and the crown bar (5), respectively, and the crown bar (5) partially extends out of the press cap (8) with the elastic force of the first spring (6).

2. The quick tightener as claimed in claim 1, characterized in that, a first via hole (12) is set at end faces of the ratchet wheel (3) for the first half-moon shaft (2b) to pass through and a second via hole (13) is set for the second half-moon shaft (2a), two connecting parts (14) are projected vertical from both end faces of the ratchet wheel (3) along edges of the first via hole (12) and second via hole (13), and said two connecting parts (14) are embedded onto the handle (4) and support (1) respectively.

3. The quick tightener as claimed in claim 2, characterized in that, the clutch device has a crown bar (5) located on the first half-moon shaft (2b) and a positioning hole (2a1) on the second half-moon shaft (2a), a first spring (6) is provided at the crown bar (5), and the crown bar (5) is embedded into the positioning hole (2a1) with the elastic force of the first spring (6).

4. The quick tightener as claimed in claim 2, characterized in that, the ratchet wheel (3) includes a first ratchet wheel (3a) and a second ratchet wheel (3b), a positioning protrusion (3a1) is provided on the first ratchet wheel (3a), a positioning recess (3b1) is provided on the second ratchet wheel (3b) which is matched with the positioning protrusion (3a1), said positioning protrusion (3a1) is embedded within the positioning recess (3b1), one of the two connecting parts (14) is located at a first end face side of the first ratchet wheel (3a) and the other connecting part (14) is located at a second end face side of the second ratchet wheel (3b).

5. The quick tightener as claimed in claim 4, characterized in that, the clutch device has a crown bar (5) located on the first half-moon shaft (2b) and a positioning hole (2a1) on the second half-moon shaft (2a), a first spring (6) is provided at the crown bar (5), and the crown bar (5) is embedded into the positioning hole (2a1) with the elastic force of the first spring (6).

6. The quick tightener as claimed in claim 4, characterized in that, said first ratchet wheel (3a) and second ratchet wheel (3b) are formed by stamping.

7. The quick tightener as claimed in claim 6, characterized in that, a tapered guide means (2a2) is located at an end of the positioning hole (2a1).

8. The quick tightener as claimed in claim 6, characterized in that, a seal ring is provided between a side face of the crown bar (5) and the crown bar seat (7).

9. The quick tightener as claimed in claim 8, characterized in that, the second half-moon shaft (2a) is fixedly connected with a hollow clutch lever seat (11), both the clutch lever (9) and the second spring (10) are located within the clutch lever seat (11), the second spring (10) is covered on the clutch lever (9), and under an elastic force of the second spring (10), an inner end of the clutch lever (9) tends to be drawn into the positioning hole (2a1), and an outer end of the clutch lever (9) tends to extend out of the clutch lever seat (11).

10. The quick tightener as claimed in claim 9, characterized in that, a seal ring is provided between the clutch lever (9) and the clutch lever seat (11).

11. The quick tightener as claimed in claim 10, characterized in that, a limitation groove (2a3) is provided on the second half-moon shaft (2a), after the second half-moon shaft (2a) axially moves relative to the ratchet wheel (3), the crown bar (5) is embedded into the limitation groove (2a3), so that the half-moon shaft (2) is positioned.

12. The quick tightener as claimed in claim 11, characterized in that, a side of the limitation groove (2a3) close to the crown bar (5) is set as an inclined guide surface (2a4) and an other side of the limitation groove (2a3) is set as an upright surface (2a5) vertical to the axial direction of the second half-moon shaft (2a).

13. The quick tightener as claimed in claim 1, characterized in that, the clutch device has a crown bar (5) located on the first half-moon shaft (2b) and a positioning hole (2a1) on the second half-moon shaft (2a), a first spring (6) is provided at the crown bar (5), and the crown bar (5) is embedded into the positioning hole (2a1) with the elastic force of the first spring (6).

* * * * *